United States Patent [19]

Suzuki et al.

[11] 4,424,518

[45] Jan. 3, 1984

[54] COLUMN DOT FORMATION IN AN INK JET SYSTEM PRINTER OF THE CHARGE AMPLITUDE CONTROLLING TYPE

[75] Inventors: Hitoshi Suzuki, Nara; Fumio Togawa, Yamatokoriyama; Mitsuhiro Hakaridani, Nara, all of Japan

[73] Assignee: Sharp Kabushiki Kaisha, Osaka, Japan

[21] Appl. No.: 256,917

[22] Filed: Apr. 23, 1981

[30] Foreign Application Priority Data

Apr. 24, 1980 [JP] Japan .................................. 55-54920

[51] Int. Cl.³ ............................................ G01D 15/18

[52] U.S. Cl. ........................................ 346/75; 346/1.1

[58] Field of Search ...................................... 346/75, 1

[56] References Cited

U.S. PATENT DOCUMENTS 4,303,925 12/1981 Harbour, Jr. et al. ........... 346/75 X

*Primary Examiner*—Jr. Miller

*Attorney, Agent, or Firm*—Birch, Stewart, Kolasch & Birch

[57] ABSTRACT

An ink jet system printer of the charge amplitude controlling type prints a desired symbol in a dot matrix fashion on a recording paper. Dots for forming a column of the dot matrix are formed in an up and down manner in order to increase the distance provided between two adjacent travelling ink droplets. When a first ink droplet is directed to a dot position higher than a dot position to which a following ink droplet is directed, the positions must be separated on the recording paper by at least a first deadzone of a first dimension. When a first ink droplet is directed to a dot position lower than a dot position to which a following ink droplet is directed, the positions must be separated on the recording paper by at least a second deadzone. The second deadzone is shorter than the first deadzone.

7 Claims, 11 Drawing Figures

FIG. 8
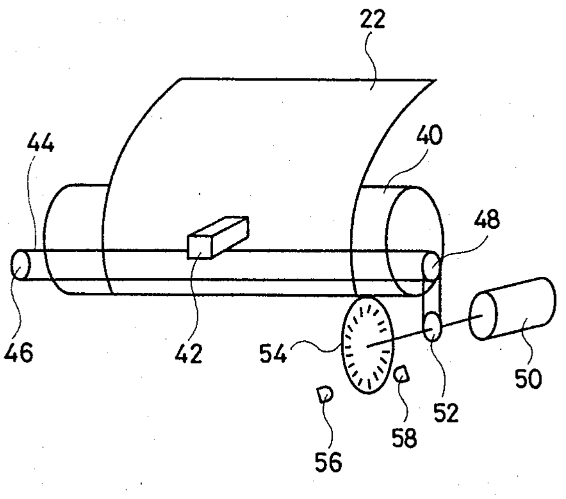
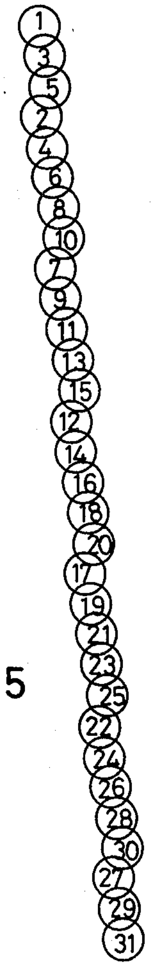
FIG. 5
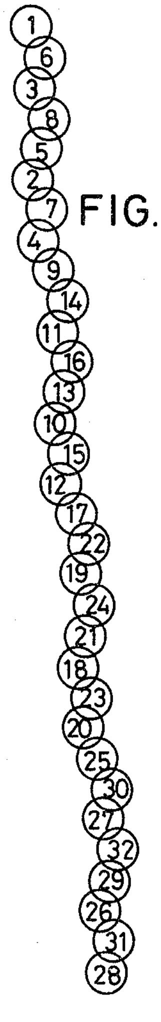
FIG. 7
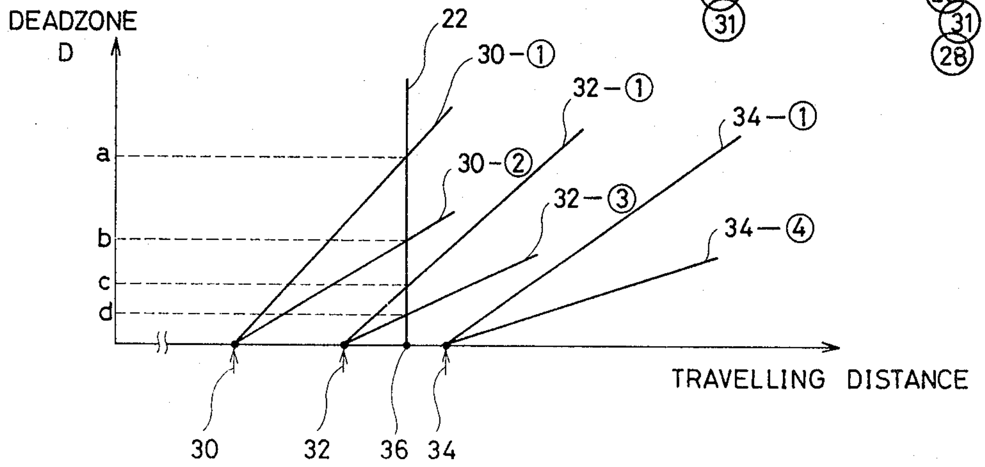
FIG. 6

FIG. 11

| INK DROPLET | $I_4$ | $I_3$ | $I_2$ | $I_1$ | $I_0$ | DOT POSITION | $O_4$ | $O_3$ | $O_2$ | $O_1$ | $O_0$ |
|---|---|---|---|---|---|---|---|---|---|---|---|
| 1 | 0 | 0 | 0 | 0 | 0 | 32 | 1 | 1 | 1 | 1 | 1 |
| 2 | 0 | 0 | 0 | 0 | 1 | 27 | 1 | 1 | 0 | 1 | 0 |
| 3 | 0 | 0 | 0 | 1 | 0 | 30 | 1 | 1 | 1 | 0 | 1 |
| 4 | 0 | 0 | 0 | 1 | 1 | 25 | 1 | 1 | 0 | 0 | 0 |
| 5 | 0 | 0 | 1 | 0 | 0 | 28 | 1 | 1 | 0 | 1 | 1 |
| 6 | 0 | 0 | 1 | 0 | 1 | 31 | 1 | 1 | 1 | 1 | 0 |
| 7 | 0 | 0 | 1 | 1 | 0 | 26 | 1 | 1 | 0 | 0 | 1 |
| 8 | 0 | 0 | 1 | 1 | 1 | 29 | 1 | 1 | 1 | 0 | 0 |
| 9 | 0 | 1 | 0 | 0 | 0 | 24 | 1 | 0 | 1 | 1 | 1 |
| 10 | 0 | 1 | 0 | 0 | 1 | 19 | 1 | 0 | 0 | 1 | 0 |
| 11 | 0 | 1 | 0 | 1 | 0 | 22 | 1 | 0 | 1 | 0 | 1 |
| 12 | 0 | 1 | 0 | 1 | 1 | 17 | 1 | 0 | 0 | 0 | 0 |
| 13 | 0 | 1 | 1 | 0 | 0 | 20 | 1 | 0 | 0 | 1 | 1 |
| 14 | 0 | 1 | 1 | 0 | 1 | 23 | 1 | 0 | 1 | 1 | 0 |
| 15 | 0 | 1 | 1 | 1 | 0 | 18 | 1 | 0 | 0 | 0 | 1 |
| 16 | 0 | 1 | 1 | 1 | 1 | 21 | 1 | 0 | 1 | 0 | 0 |
| 17 | 1 | 0 | 0 | 0 | 0 | 16 | 0 | 1 | 1 | 1 | 1 |
| 18 | 1 | 0 | 0 | 0 | 1 | 11 | 0 | 1 | 0 | 1 | 0 |
| 19 | 1 | 0 | 0 | 1 | 0 | 14 | 0 | 1 | 1 | 0 | 1 |
| 20 | 1 | 0 | 0 | 1 | 1 | 9 | 0 | 1 | 0 | 0 | 0 |
| 21 | 1 | 0 | 1 | 0 | 0 | 12 | 0 | 1 | 0 | 1 | 1 |
| 22 | 1 | 0 | 1 | 0 | 1 | 15 | 0 | 1 | 1 | 1 | 0 |
| 23 | 1 | 0 | 1 | 1 | 0 | 10 | 0 | 1 | 0 | 0 | 1 |
| 24 | 1 | 0 | 1 | 1 | 1 | 13 | 0 | 1 | 1 | 0 | 0 |
| 25 | 1 | 1 | 0 | 0 | 0 | 8 | 0 | 0 | 1 | 1 | 1 |
| 26 | 1 | 1 | 0 | 0 | 1 | 3 | 0 | 0 | 0 | 1 | 0 |
| 27 | 1 | 1 | 0 | 1 | 0 | 6 | 0 | 0 | 1 | 0 | 1 |
| 28 | 1 | 1 | 0 | 1 | 1 | 1 | 0 | 0 | 0 | 0 | 0 |
| 29 | 1 | 1 | 1 | 0 | 0 | 4 | 0 | 0 | 0 | 1 | 0 |
| 30 | 1 | 1 | 1 | 0 | 1 | 7 | 0 | 0 | 1 | 1 | 0 |
| 31 | 1 | 1 | 1 | 1 | 0 | 2 | 0 | 0 | 0 | 0 | 1 |
| 32 | 1 | 1 | 1 | 1 | 1 | 5 | 0 | 0 | 1 | 0 | 0 |

COLUMN DOT FORMATION IN AN INK JET SYSTEM PRINTER OF THE CHARGE AMPLITUDE CONTROLLING TYPE

BACKGROUND AND SUMMARY OF THE INVENTION

The present invention relates to an ink jet system printer of the charge amplitude controlling type and, more particularly, to a control system for forming column dots in a dot matrix pattern.

An ink jet system printer of the charge amplitude controlling type includes a laterally travelling printer head carrying an ink droplet issuance unit, a charging tunnel and a pair of deflection electrodes. Ink droplets emitted from the ink droplet issuance unit are charged by the charging tunnel in accordance with a video signal, and deflected in the vertical direction while they pass through a high voltage constant electric field established by the pair of deflection electrodes.

In order to enhance the print velocity, it is required that the ink droplets are emitted at a high frequency. Further, to obtain a large deflection by a relatively low deflection voltage, it is required that a recording paper is positioned away from the pair of deflection electrodes. Thus, the ink droplets must travel in the air for a preselected distance. Therefore, there is a possibility that two sequential ink droplets combine with each other due to the air resistance encountered by the preceding ink droplet and the electrostatic force created between the two ink droplets. This undesirable connection of the travelling two ink droplets precludes an accurate printing.

Accordingly, an object of the present invention is to provide a novel column dot formation control system for ensuring an accurate printing.

Another object of the present invention is to enhance the printing velocity without deteriorating the printing quality.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, the column dots are not formed in the normal order, but the column dots are formed in an alternating up and down order in a preselected sequence, thereby increasing the distance between two sequentially adjacent ink droplets travelling through the air. In a preferred form, the first ink droplet is assigned to the uppermost first dot position. The second ink droplet is directed to the fourth dot position. The third ink droplet is directed to the second dot position, the fourth ink droplet is directed to the fifth dot position, the fifth ink droplet to the third dot position, the sixth ink droplet to the sixth dot position, and the seventh ink droplet is directed to the ninth dot position. The eighth ink droplet is directed to the seventh dot position, the ninth ink droplet is to the tenth dot position, and the tenth ink droplet is directed to the eighth dot position. The above-mentioned dot assignment is memorized in a read-only-memory, which is combined with a print information signal to develop a video signal to be applied to the charging tunnel.

BRIEF DESCRIPTION OF THE DRAWINGS

The present invention will be better understood from the detailed description given hereinbelow and the accompanying drawings which are given by way of illustration only, and thus are not limiting of the present invention and wherein:

FIG. 5 is a schematic paln view showing a column dot formation sequence in an embodiment of an ink jet system printer of the charge amplitude controlling type of the present invention;

FIG. 6 is a graph showing a relationship between the contacting point and the deadzone in an ink jet system printer of the charge amplitude controlling type;

FIG. 7 is a schematic view showing a column dot formation sequence in another embodiment of an ink jet system printer of the charge amplitude controlling type of the present invention;

FIG 8 is a schematic perspective view of an embodiment of an ink jet system printer of the charge amplitude controlling type of the present invention;

FIG. 11 is a table for explaining an operation mode of a converter ROM included in the video generator of FIG. 9.

DESCRIPTION OF THE PREFERRED EMBODIMENTS

Figure 1:
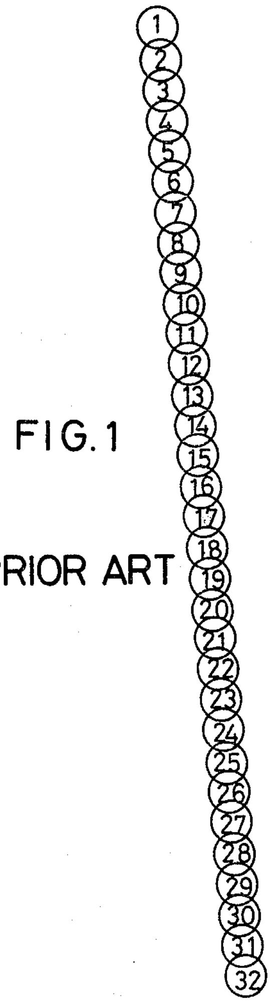
FIG.1 PRIOR ART
FIG. 1 is a schematic plan view showing a column dot formation sequence in the conventional ink jet system printer of the charge amplitude controlling type.

In the conventional ink jet system printer of the charge amplitude controlling type, column dots are formed in the order shown in FIG. 1. In such an ink jet system printer, attention should be directed to the air resistance interference affecting the travelling ink droplets.

Figure 2:
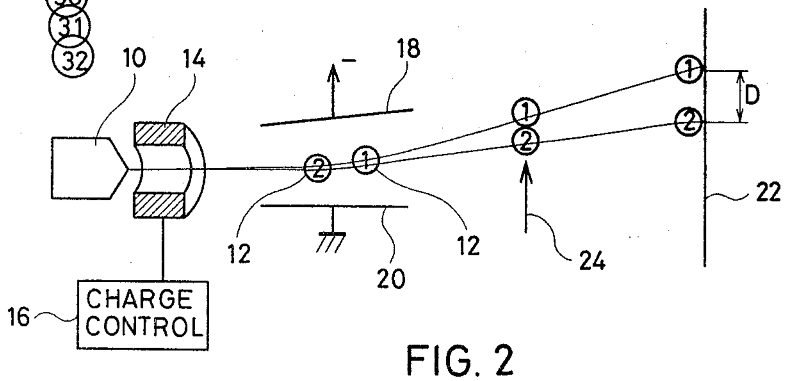
FIG. 2 is a schematic sectional view of an ink jet system printer of the charge amplitude controlling type showing travelling ink droplets.

FIG. 2 shows a typical construction of an ink jet system printer of the charge amplitude controlling type. The ink jet system printer of the charge amplitude controlling type comprises an ink droplet issuance unit 10 to which an electromechanical transducer is attached for emitting ink droplets 12 at a given frequency. A charging tunnel 14 is disposed in front of the ink droplet issuance unit 10 for charging the ink droplets 12 in accordance with a charging signal derived from a charge control circuit 16. More specifically, the ink droplets 12 are charged by the charging tunnel 14 in accordance with print information. The thus charged ink droplets 12 are deflected while they pass through a high voltage constant electric field established by a pair of deflection plates 18 and 20, and directed to a recording paper 22 to print the character in the dot matrix fashion. The deflection is in the vertical direction, and the lateral displacement is achieved by the lateral movement of a printer head carrying the ink droplet issuance unit 10, the charging tunnel 14 and the pair of deflection plates 18 and 20.

The air resistance encountered by the first ink droplet ① is greater than that encountered by the following ink droplet ②. Therefore, there is a possibility that the ink droplet ② catches the preceding ink droplet ① while they travel through the air toward the recording paper 22. If the two ink droplets combine with each other at a connecting point 24, an accurate printing can not be achieved on the recording paper 22. When the system is constructed to prevent the above-mentioned connection, the adjacent two ink droplets are spaced apart by a distance D on the recording paper 22. The distance D is referred to as the deadzone.

One method to eliminate the above-mentioned connection is to locate the recording paper 22 before the connecting point 24. However, when the recording paper 22 is positioned before the connecting point 24, the travelling distance of the ink droplets is reduced. Thus, the deflection amount is innevitably reduced. To obtain the desired deflection, the deflection voltage must be increased. This will create another problem such as an isolation breakdown. Alternatively, the charge voltage applied to the ink droplets 12 can be increased to obtain the desired deflection. However, the charge amount is limited by the resistance value of the ink.

The above-mentioned connection may be observed not only between the first and second ink droplets but also, for example, between the first and third ink droplets, and between the first and fourth ink droplets. Such a connection point is farther than the connecting point 24.

The connecting point 24 should be located as far away as possible from the deflection plates 18 and 20 when the ink droplet travelling distance is not changed in order to obtain the desired deflection. In order to locate the connecting point 24 far away from the deflection plates 18 and 20, the spacing provided between travelling ink droplets must be increased. For increasing the spacing provided between the ink droplets, the following two methods are considered.

(1) Ink droplet formation frequency is reduced to increase the distance between the two ink droplets.

(2) Ink droplets not contributing to the actual printing operation are interposed between the ink droplets contributing to the actual printing operation, thereby increasing the distance between the ink droplets contributing to the actual printing operation.

The above-mentioned two methods are not practical because the printing velocity is reduced. Further, the ink droplet formation is not stable when the above method (1) is employed.

In order to locate the connecting point 24 for away from the deflection plates 18 and 20, the following method is considered.

(3) Ink droplet travelling velocity is increased.

However, the method (3) is not useful because great amount of ink mist is generated when the ink droplets impinge on the recording paper 22, which deteriorates the printing quality. Moreover, the deflection amount is reduced when the ink droplet travelling velocity is increased.

Figure 3:
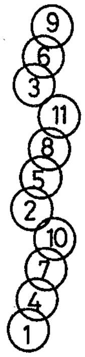
FIG. 3 PRIOR ART
FIG. 3 is a schematic plan view showing a column dot formation sequence in an ink jet system printer of the charge amplitude controlling type of prior art.
Figure 4:
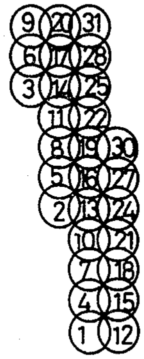
FIG. 4 PRIOR ART
FIG. 4 is a schematic plan view showing an improvement in the column dot formation sequence of FIG. 3.

To minimize the above-mentioned defects, a novel column dot formation control is proposed in U.S. Pat. No. 4,054,882, NON-SEQUENTIAL INK JET PRINTING, issued on Oct. 18, 1977. In this system, the column dots are not formed sequentially. FIG. 3 shows the column dot formation sequence in U.S. Pat. No. 4,054,882. In this method, inaccuracy of alignment of the column dots is so great that an improved formation as shown in FIG. 4 is proposed in U.S. Pat. No. 4,054,882. In the method of FIG. 4, a plurality of columns are printed simultaneously. The printer head travelling speed must be accurately synchronized with the droplet formation and, therefore, the system control becomes complicated.

FIG. 5 shows an embodiment of a column dot formation sequence of the present invention. The first ink droplet ① is directed to the first dot position, the second ink droplet ② is directed to the fourth dot position, the third ink droplet ③ is to the second dot position, the fourth ink droplet ④ to the fifth dot position, the fifth ink droplet ⑤ is to the third dot position, the sixth ink droplet ⑥ is directed to the sixth dot position, the seventh ink droplet ⑦ is to the ninth dot position, and so forth. In the method described, the column dots are formed in an up and down manner so that a second ink droplet is directed to the dot position lower than a first ink droplet by three dot positions, and a third droplet is directed to the dot position higher than the second ink droplet by two dot positions. By controlling the ink droplets in the abovemetnioned sequence, the combining of the travelling ink droplets does not occur since the ink droplets are spaced apart from each other by more than the deadzone D.

The above described three droplet sequence may be extended to form a printed line of chosen length.

FIG. 6 shows the relationship between the travelling distance of the ink droplets and the deadzone D. A point 30 represents a point at which the second ink droplet catches the first ink droplet. A point 32 represents a point at which the third ink droplet catches the first ink droplet. A point 34 represents a point at which the fourth ink droplet catches the first ink droplet. In order to prevent the connection of the two ink droplets at the point 30, the first ink droplet must be deflected in a line 30-① as compared with the second ink droplet when the second ink droplet is directed to a position lower than the first ink droplet. Conuersely, when the second ink droplet is directed to a position higher than the first ink droplet, the second ink droplet must be deflected in a line 30-② as compared with the first ink droplet.

Further, in order to prevent the connection of the two ink droplets at the point 32, the first ink droplet must be deflected in a line 32-① as compared with the third ink droplet when the third ink droplet is directed to a position lower than the first ink droplet. When the third ink droplet is directed to a position higher than the first ink droplet, the third ink droplet must be deflected in a line 32-③ as compared with the first ink droplet. Regarding the connecting point 34, the first ink droplet must be deflected in a line 34-① as compared with the fourth ink droplet when the fourth ink droplet is directed to the lower position, or the fourth ink droplet must be deflected in a line 34-④ when the first ink droplet is directed to the lower position.

When the recording paper 22 is located at a point 36 between the point 32 and 34, the fourth ink droplet never catches the first ink droplet. It will be clear from FIG. 6 that the second ink droplet must be separated at the recording paper 22 from the first ink droplet by at least the deadzone a when the second ink droplet is directed to the print position lower than that of the first ink droplet.

Further, the third ink droplet must be separated from the second ink droplet at the recording paper 22 by at least the deadzone b when the third ink droplet is directed to the print position higher than that of the second ink droplet. Moreover, the third ink droplet must be separated from the first ink droplet at the recording paper 22 by at least the deadzone c when the third ink droplet is directed to the print position lower than that of the first ink droplet. For a given droplet, the deadzone D is longer when the preceding ink droplet is directed to a higher print position as compared with the case wherein the preceding ink droplet is directed to a lower print position.

In the example of FIG. 5, the second ink droplet ② must be separated from the first ink droplet ① on the recording paper 22 by more than the deadzone a which is less than the three dot position. The third ink droplet ③ must be separated from the second ink droplet ② on the recording paper 22 by more than the deadzone b which is less than the two dot position. Further, the third ink droplet ③ must be spaced apart from the first ink droplet ① on the recording paper 22 by more than the deadzone c which is less than the one dot position. The fourth ink droplet ④ must be separated from the third ink droplet ③ on the recording paper 22 by more than the deadzone a. Further the fourth ink droplet ④ must be separated from the second ink droplet ② on the recording paper 22 by more than the deadzone c. In this way, the column dots are sequentially formed in the up and down fashion.

FIG. 7 shows another embodiment of the column dot formation sequence of the present invention. The five dot position is selected longer than the deadzone a. The three dot position is selected longer than the deadzone b, the two dot position is selected longer than the deadzone c, and the one dot position is selected longer than the deadzone d.

FIG. 8 schematically shows an ink jet system printer for performing the column dot formation sequence as shown in FIG. 5 or 7.

The ink jet system printer of the charge amplitude controlling type includes the recording paper 22 supported by a platen 40. A printer head 42, carrying the ink droplet issuance unit, the charging tunnel and the deflection plates, is secured to a wire 44 which is extended between a pulley 46 and a drive wheel 48. The drive wheel 48 is connected to a drive shaft of a motor 50 via a transfer wheel 52 for reciprocating the printer head 42 along the recording paper 22. A slit plate 54 is secured to the transfer wheel 52 for detecting the rotation of the motor 50 in combination with a light emitting element 56 and a light responsive element 58. The slit detection signal is used to synchronize the one line printing. The printer head 42 is driven to travel in the lateral direction at a speed to pass one column width in a time period longer than the time period required for emitting ink droplets assigned to one column.

It will be clear from the foregoing description, in accordance with the present formation method, the column dots included in one column are sequentially formed in the up and down manner by providing a desired distance between two successive ink dots without the necessity of providing ink droplets not contributing to the actual printing operation.

Figure 9:
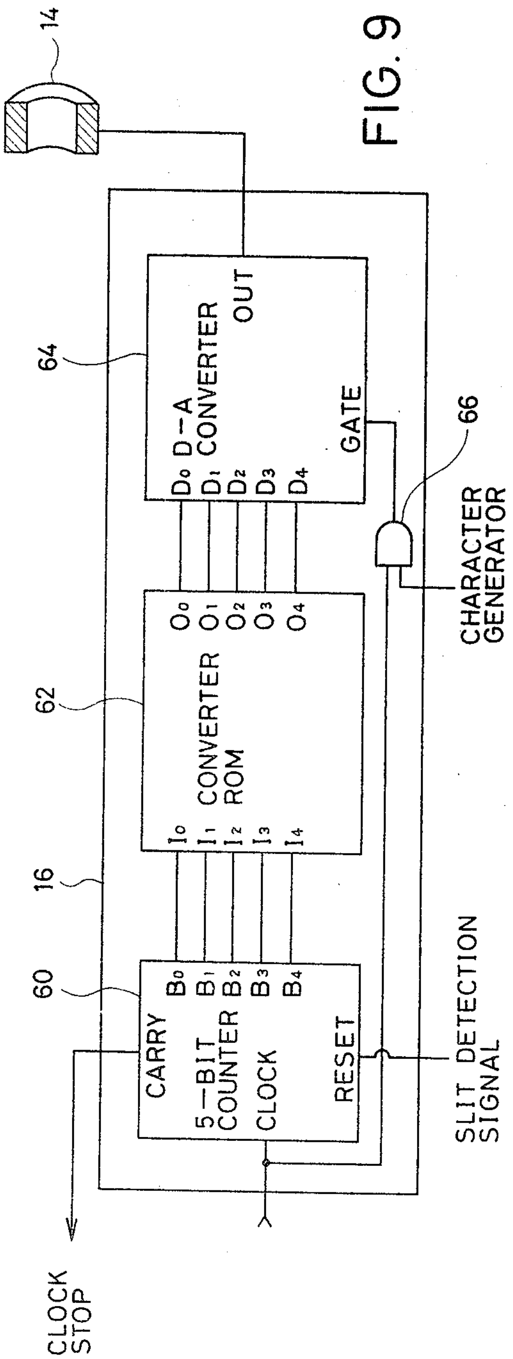
FIG. 9 is a block diagram of an essential part of a video generator included in the ink jet system printer of FIG. 8 for controlling the column dot formation sequence of FIG. 7.

FIG. 9 schematically shows an essential part of a video generator for controlling the column dot formation sequence shown in FIG. 7. A five-bit counter 60 performs the count operation in response to the trailing edge of a clock pulse. The five-bit counter 60 includes a reset terminal to which the slit detection signal is applied from the light responsive element 58. When the slit detection signal is applied to the reset terminal, the five-bit counter 60 is cleared to "00000" and, then, performs the count operation. The count contents stored in the five-bit counter 60 are applied to a converter ROM 62 which develops a converted output signal representative of the dot position. FIG. 11 shows the relationship between the input signal and the output signal of the converter ROM 62, wherein the dot position 32 is the uppermost position and the dot position 1 is the lowermost position.

Figure 10:
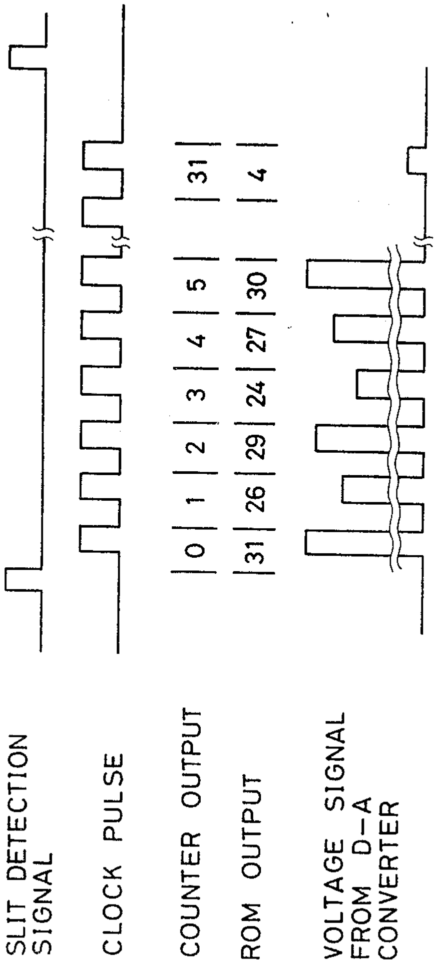
FIG. 10 is a time chart showing various signals occurring within the video generator of FIG. 9.

The output signal of the converter ROM 62 is applied to a D-A converter 64 which develops a voltage signal having a level corresponding to the output signal of the converter ROM 62 when the gate terminal of the D-A converter 64 receives a control signal of the logic high. The gate terminal receives an output signal of an AND gate 66 which receives the clock pulse and a pattern data derived from a character generator. The thus obtained voltage signal is applied to the charging tunnel 14 to charge the ink droplets to a desired level. FIG. 10 shows various signals occurring within the video generator of FIG. 9.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method for forming a dot column with an ink jet system printer of the charge amplitude controlling type wherein charged ink droplets are deflected as they pass through a constant high voltage deflection electric field in accordance with the charge amount carried thereon, and the deflected ink droplets are deposited on a recording medium to print a desired symbol in a dot matrix fashion, said column dot formation method comprising at least:

a first step of applying a first charge voltage to a first ink droplet so that said first ink droplet is directed to a first dot position in said column on said recording medium;

a second step of applying a second charge voltage to a second ink droplet next following said first ink droplet so that said second ink droplet is directed to a second dot position in said column on said recording medium, said second dot position being separated from said first dot position by at least a first preselected distance in a first direction; and a third step of applying a third charge voltage to a third ink droplet next following said second ink droplet so that said third ink droplet is directed to a third dot position in said column on said recording medium, said third dot position being separated from said second dot position by at least a second preselected distance in a second direction substantially opposite to said first direction and separated from said first dot position by at least a third preselected distance.

2. The dot column formation method of claim 1, wherein:

said first preselected distance is longer than said second preselected distance; and said second preselected distance is longer than said third preselected distance.

3. The dot column formation method of claim 1, wherein:

said first preselected distance is longer than a first deadzone defining a distance by which a first ink droplet directed to a first dot position and a next following ink droplet which is directed to a second dot position spaced from said first position in said first direction must be spaced to avoid collision of said droplets; and said second preselected distance is longer than a second deadzone defining a distance by which a first ink droplet directed to a first dot position and a next following ink droplet which is directed to a second dot position spaced from said first position in said second direction must be spaced to avoid collision of said droplets.

4. The dot column formation method of claim 1, wherein said first direction is a generally vertically downward direction, and said second direction is a generally vertically upward direction.

5. The dot column formation method of claim 1, further comprising a fourth step of:

applying a fourth charge voltage to a fourth ink droplet next following said third ink droplet so that said fourth ink droplet is directed to a fourth dot position in said column, said fourth dot position being separated from said third dot position by at least said first preselected distance in said first direction and spaced from said second dot position by at least said third preselected distance.

6. The dot column formation method of claim 5, further comprising a fifth step of:

applying a fifth charge voltage to a fifth ink droplet next following said fourth ink droplet so that said fifth ink droplet is directed to a fifth dot position in said column, said fifth dot position being separated from said fourth dot position by at least said second preselected distance in said second direction and spaced from said third dot position by at least said third preselected distance.

7. The dot column formation method of claim 6, further comprising repeating said first through fifth steps for sixth and subsequent dot positions to form a column of desired length.

* * * * *